United States Patent [19]
Janis et al.

[11] Patent Number: 6,115,549
[45] Date of Patent: *Sep. 5, 2000

[54] DIRECTORY-SERVICES-BASED SOFTWARE DISTRIBUTION APPARATUS AND METHOD

[75] Inventors: Damon V. Janis, Provo; Todd F. Millett, Lindon; Calvin R. Gaisford, Sandy; Matthew G. Brooks, Orem; Carla M. Heesch, Spring Lake, all of Utah

[73] Assignee: Novell, Inc., Provo, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/798,837

[22] Filed: Feb. 12, 1997

[51] Int. Cl.$^7$ ..................................................... G06F 9/445
[52] U.S. Cl. ........................... 395/712; 707/10; 707/103; 707/104
[58] Field of Search ............................... 395/712, 200.33, 395/200.51, 200.52; 380/25; 707/2, 3, 10; 705/35; 364/300

[56] References Cited

U.S. PATENT DOCUMENTS

| | | | |
|---|---|---|---|
| 4,558,413 | 12/1985 | Schmidt et al. | 364/300 |
| 4,769,772 | 9/1988 | Dwyer et al. | 364/300 |
| 4,825,354 | 4/1989 | Agrawal et al. | 364/200 |
| 5,483,652 | 1/1996 | Sudama et al. | 395/600 |
| 5,495,610 | 2/1996 | Shing et al. | 395/600 |
| 5,497,463 | 3/1996 | Stein et al. | 395/200.03 |
| 5,499,289 | 3/1996 | Bruno et al. | 379/220 |
| 5,522,044 | 5/1996 | Pascucci et al. | 395/200.06 |
| 5,553,282 | 9/1996 | Parrish et al. | 395/600 |
| 5,557,798 | 9/1996 | Skeen et al. | 395/650 |
| 5,560,005 | 9/1996 | Hoover et al. | 395/600 |
| 5,561,799 | 10/1996 | Khalidi et al. | 395/600 |
| 5,692,129 | 11/1997 | Sonderegger et al. | 385/200.11 |
| 5,761,499 | 6/1998 | Sonderegger | 395/610 |
| 5,794,232 | 8/1998 | Mahlum et al. | 707/3 |
| 5,818,936 | 10/1998 | Mashayekhi | 380/25 |
| 5,867,714 | 2/1999 | Todd et al. | 395/712 |

OTHER PUBLICATIONS

HP30087.0021, "(Part 1 of 3) Glossary", Hewlett Packard manual excerpt, SPI Database of Software Technologies, Copyrighted 1995, 1996 Software Patent Institute, two pages.

HP300124.0086, "(Part 1 of 3) Glossary", Hewlett Packard manual excerpt, SPI Database of Software Technologies, Copyrighted 1995, 1996 Software Patent Institute, two pages.

HP300132.0059, "(Part 1 of 3) Glossary", Hewlett Packard manual excerpt, SPI Database of Software Technologies, Copyrighted 1995, 1996 Software Patent Institute, two pages.

(List continued on next page.)

*Primary Examiner*—Tariq R. Hafiz
*Assistant Examiner*—Hoang-Vu Antony Nguyen-Ba
*Attorney, Agent, or Firm*—Madson & Metcalf

[57] ABSTRACT

An apparatus for distributing software implements directory services of a network to provide data for controlling a distribution of software. A software object may be any electronic representation of data of any type, from a single byte, to a complex application, or the like. A directory services computer, responsible for maintaining a data store of inter-related logical entities may store a distribution object containing all distribution information associated with a distribution. Distribution information may include a listing of targets, actual entities represented as logical entities in the data store, which are to receive a distribution of a software object. The directory services computer provides instantiations of various portions or an entire data store to be read by various nodes or computers throughout a network or internetwork. Accordingly, an individual computer, such as an individual client or workstation may read information in a distribution object, identified itself as a target of a distribution, and pull the designated software object, completing the distribution to itself. Distribution may also be effected by a workstation from a remote source node to a remote destination node. Authorizations, timing, targets, and software objects, may all be identified in a distribution object.

27 Claims, 8 Drawing Sheets

OTHER PUBLICATIONS

HP300202.0017, "(Part 1 of 3) Glossary", Hewlett Packard manual excerpt, SPI Database of Software Technologies, Copyrighted 1995, 1996 Software Patent Institute, two pages.

HP60074.0049, "Packaging Concepts", Hewlett Packard manual excerpt, SPI Database of Software Technologies, Copyright 1995, 1996 Software Patent Institute, two pages.

"Method for Creation of a Control Software Update Application on General Distribution Media," *IBM Technical Disclosure Bulletin*, vol. 29, No. 9, Feb. 1987, p. 3839.

"Recursive Lister for the Distributed Computing Environment Cell Directory Services Namespace," *IBM Technology Disclosure Bulletin*, vol. 37, No. 06A, Jun. 1994, pp. 327–328.

"CDSEL—Recursive Delete Tool for the Distributed Computing Environment Cell Directory Services Namespace", *IBM Technical Disclosure Bulletin*, vol. 37, No. 07, Jul. 1994, pp. 607–608.

"Distributed Computing Now: Application Environments", *Dr. Dobb's Journal*, Jun., 1993, pp. 82–85.

SEGAL.0074, "Research Contributions", thesis excerpts by Mark Edward Segal, copyrighted 1989, portions of Chapter 7, two pages.

Hanish–Payne–Hayes, Astronomical Software Directory Service, NTIS, Jan. 1997.

Olson–Holly–Strutt, Integrating multiple directory services, Digital Technical Journal, Jan. 1996.

O'Brien–DuBois, Getting a grip on directory services, Business Communications Review, Dec. 1995.

Searching for software, Modern Office Procedures, Sep. 1983.

Novell: Novell delivers new software distribution tool for intranetsand corporate networks, M2 Presswire, Apr. 1997.

Novell automates software distribution process, Telecomworldwire, Apr. 1997.

DIRECTORY-SERVICES-BASED SOFTWARE DISTRIBUTION APPARATUS AND METHOD

BACKGROUND

1. The Field of the Invention

This invention relates to distribution of software over a network and, more particularly, to novel systems and methods for using directory services data stores as a mechanism for effecting software distribution by nodes at the lowest possible node level in a hierarchy.

2. The Background Art

Distribution of software has become an industry within an industry. Manufacturers of software products must distribute those products to users. Meanwhile, system managers responsible for maintaining synchronization of software versions of licensed software, databases, internal software tools, and the like have no small task.

Software distribution has associated therewith an additional problem. Communication of the need for software must be made. Moreover, authorizations, timing, delivery, and the like, are issues that each user at a node in a network or a broader internetwork must accommodate. Likewise, system managers within organizations, departments, companies, sites at disparate locations, and the like must decide, authorize, distribute, and manage over organizations and wide physical terrain. The "sneaker net" is still in use, by which system managers actually distribute physical (e.g., on floppy disk, CD-ROM, etc.) copies of software. Moreover, many decisions are charted manually, authorization lists are authored and distributed, with feedback by any number of methods.

Directory services have been developed, creating logical entities combined in data stores to represent organizations and entities that physically exist. One such popular directory services system is the Novell Directory Services (NDS) based on the X.500 network services protocol published by the CCIT and Open Systems Interconnection Consortium. A memory device 14 may include volatile random access memory 20, read-only memory 18, non-volatile memory 16/18, or the like. In the example of client/server networks, a distributed directory may span several server nodes in a network. Information on a distributed directory may be created, read, modified, and shared by multiple nodes, such as client nodes or server nodes in networks of various sizes.

A distributed directory typically contains a collection of objects, sometimes referred to as entities or identities, each having associated attributes or properties. For example, an object may represent a person, a particular computer, an organizational structure, a machine in a factory, an item or inventory, or the like. Associated attributes may include names, titles, identifiers, and the like having values recognizable by some software accessing such a distributed directory. Objects in a distributed directory may represent users, software objects or modules, computers, peripheral devices connectable to computers such as printers, data or software resources available to a user or a computer in a library, available files, programs, and the like.

In the directory services system, a structure of a distributed directory may be covered by a set of rules for adding and managing objects, and attributes of objects within a distributed directory.

For example, rules may specify, such as through a dictionary, a standard set of data types, according to which objects may be created. Thus, an object may belong to a class having certain associated attributes. Attributes may be based on a set of standard attribute types, in turn based on certain standard attribute syntax.

An important part of directory services data structures (e.g. objects) is the ability to represent relationships among objects in a distributed directory. A schema typically controls these relationships, specifying a certain hierarchy among object classes. A group of object classes may exist, within which bounds, certain subordinate objects may be formed within a hierarchy. An object that contains another object is referred to as a container object. Container objects are building blocks of a distributed directory. An object incapable of containing another object may not have subordinate objects within an hierarchy. Thus, such an object is a leaf object or a terminal object in a tree (hierarchy) of objects.

A distributed directory may be arranged in a hierarchical structure in the form of a tree, wherein branching points or terminal points (leaves) represent objects, and theater connecting branches represent relationships. The relationships are typically contained in the binding between different objects or different object types.

A distributed directory may be organized in partitions, each made up of some number of objects pertaining to a subtree or logical subtree. Any node (object) is considered a parent to any contained objects descending therefrom, as children or child objects. Similarly, partitions (subtrees) may be parent partitions to child partitions farther removed from some root. A partition may be identified in one simple scheme by the name of the node or object entry that forms the root of the subtree representing the partition.

In a distributed directory, various partitions may be stored at numerous locations throughout a network. Nevertheless, a particular server may have a unique set of partitions, and therefore a unique set of objects. Replicas may be able to be read-only, or read/write. The operation of directory services is understood in the art.

Unfortunately, the great knowledge stored in a directory services system has not heretofore been available for ready use by a system manager for purposes of distributing software. Nevertheless, the very issues that a system manager must deal with in communication, authorization, distribution, feedback, and the like could conceivably be embodied in objects or attributes of objects within a directory services system. An apparatus and method are needed to take advantage of the information available and easily managed in a network directory services system. This information may relieve the heavy physical and logistical burden on systems managers who are trying to manage and execute the distribution of software.

BRIEF SUMMARY AND OBJECTS OF THE INVENTION

In view of the foregoing, it is a primary object of the present invention to provide an apparatus for distributing software over a network, using a directory services system associated with the network to provide controlling data and targeting for such distributions.

It is another object of the invention to provide distribution of a software object from a source node, using distribution-controlling data provided from a directory services data store of a directory services node in the network.

It is an object of the invention to provide a workstation node programmed to receive distribution-controlling data from a distribution object maintained by a directory services node and to distribute a software object from a remote node in accordance therewith.

It is an object of the invention to provide a "pulling" distribution by a workstation node to itself, based on distribution parameters in a distribution object stored as one of the logical entities in a data store of related logical entities maintained by a directory services system It is an object of the invention to provide a distribution list in a distribution object to identify targets represented in multiple, different levels of a hierarchy in a directory services system.

It is an object of the invention to provide and use scheduling data for controlling scheduling of a distributed, remote distribution of a software object from one node to others, in parallel.

It is an object of the invention to provide memory storing directory services software for relating and managing a data store of logical entities, one of which is a distribution object providing control data for distribution of a software object to real entities represented by certain of the logical entities.

It is an object of the invention to provide distribution of a software object from a source node to a remote workstation node, by the workstation node.

It is an object of the invention to provide a distribution object containing a distribution list identifying targets selected from real entities corresponding to logical entities in a directory services system such that the real entities may conduct the distribution themselves in accordance with controlling data (e.g. scheduling data) in the distribution object.

It is an object of the invention to provide the foregoing features for a distribution to multiple targets selected simultaneously from more than one level of a hierarchy of logical entities.

It is an object of the invention to provide a method for distributing software over a network, using a directory services system of the network to provide controlling data useable by nodes in the network to determine targets and conduct the distribution to themselves or other nodes so targeted.

Consistent with the foregoing objects, and in accordance with the invention as embodied and broadly described herein, an apparatus and method are disclosed in one embodiment of the present invention as including a network interconnecting a source node storing a software object to a directory services node operably programmed to maintain a data store of logical entities interrelated to one another in a hierarchy. A workstation node in the network is programmed to receive from the directory services node certain distribution-controlling data for controlling distribution of the software object to nodes in the network, such as to the workstation node itself.

The distribution-controlling data may reside in a distribution object, which may be one of the logical entities. The distribution object, certain data therein, or both, may be recognizable by the workstation node, prompting the workstation node to make the distribution.

For example, in a distribution object, a distribution list identifying targets corresponding to the logical entities may be readable by the workstation node, which finds itself listed. In a hierarchy of multiple levels containing the various logical entities, the distribution list may identify targets from more than one of the levels for a single distribution. A distribution object may contain scheduling data and any other parameters useful for controlling a distribution of a software object. Parallel distributions may be conducted by multiple workstation nodes.

Data and executables may be stored in one or more memory devices accessible over the network. Thus, a data store, a software object, a directory services executable effective to provide directory services, a distribution executable to effect a distribution in accordance with a distribution object, and the like may be stored for access in accordance with rights and relationships maintained by a directory services system.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 8, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

Those of ordinary skill in the art will, of course, appreciate that various modifications to the details illustrated in the schematic diagrams of FIGS. 1–8 may easily be made without departing from the essential characteristics of the invention. Thus, the following description is intended only as an example, and simply illustrates one presently preferred embodiment consistent with the invention as claimed herein.

Figure 1:
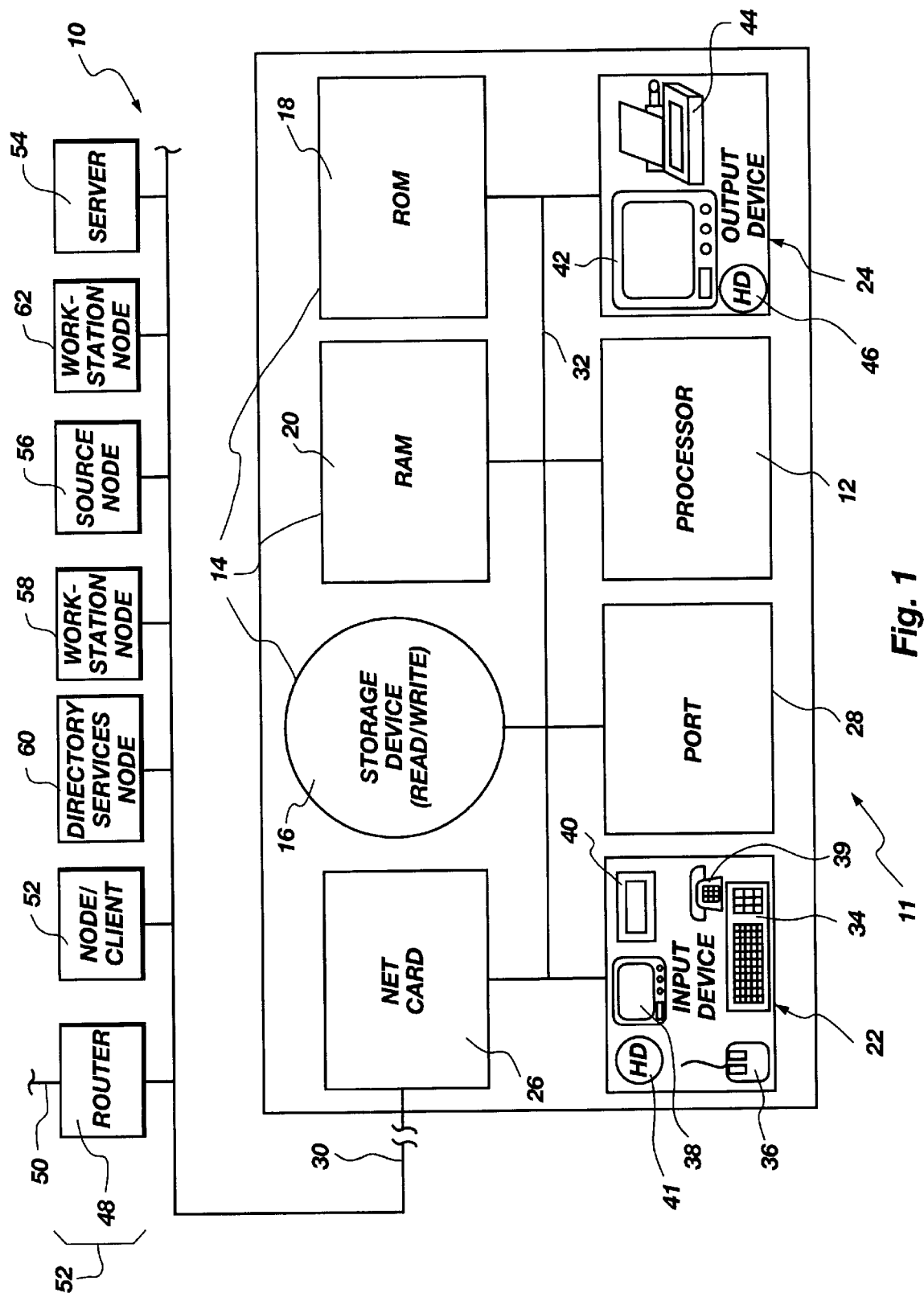
FIG. 1 is a schematic block diagram of an apparatus in accordance with the invention.

Referring now to FIG. 1, an apparatus 10 may include a node 11 (client 11, computer 11) containing a processor 12 or CPU 12. The CPU 12 may be operably connected to a memory device 14. A memory device 14 may include one or more devices such as a hard drive 16 or non-volatile storage device 16, a read-only memory 18 (ROM) and a random-access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like.

Similarly, a scanner 40 may be used to receive graphical inputs which may or may not be translated to other character formats. A hard drive 41 or other memory device 14 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 may have various communication capabilities.

In certain embodiments, a minimum of logical capability may be available in any node 52. Note that any of the individual nodes 52 may be referred to, as may all together, as a node 52 or nodes 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components of the apparatus 10 may need to communicate data with one another. A communication link may exist, in general, between any pair of devices or components.

By the expression "nodes" 52 is meant any one or all of the nodes 48, 52, 54, 56, 58, 60, 62, 11. Thus, any one of the nodes 52 may include any or all of the component parts illustrated in the node 11.

The source node 56 is so called because it stores a software object 100 (see FIG. 4) to be distributed to other nodes 52. The workstation node 58 is so designated in that it conducts a distribution of the software object 100 from the source node 56.

Software may include applications, executables, or any file, block, bytes, or bits of data that may be packeted or otherwise transferred between cooperating elements of a computer network.

In general, software may be embodied in an object 100. By a software object 100 is not meant necessarily a programming object. Rather any bits, bytes, files, applications, packets, blocks, or the like may be identified and isolated for distribution. Such an identifiable entity to be distributed may be thought of and referred to as a software object 100.

The directory services node 60 provides the directory services as known in the art. Accordingly, the directory services node 60 hosts the software and data structures required for providing directory services to the nodes 52 in the network 30 and may do so for other nodes 52 in other networks 50. The directory services node 60 contains a data store 78 (see FIG. 2) containing logical entities 82. Among the logical entities 82 is a distribution object 80 (see FIG. 3) that will provide the information required for the workstation node 58 to conduct a distribution of the software object 100 from the source node 56.

The directory services node 60 may typically be a server 54 in a network. However, it may be installed in any node 52. To support directory services, a directory services node 52 may typically include a network card 26 for connecting to the network 30, a processor 12 for processing software commands in the directory services executables, a memory device 20 for operational memory as well as a non-volatile storage device 16 such as a hard drive 16. Typically, an input device 22 and an output device 24 are provided for user interaction with the directory services node 60.

The term "application object" may refer to the same entity as the term "distribution object" herein.

In general, any number of workstation nodes 58, 62 may exist in a network 30, within some practical limit. A workstation node 58, 62 may conduct a distribution of a software object 100 to itself, or to some other node 52.

Figure 2:
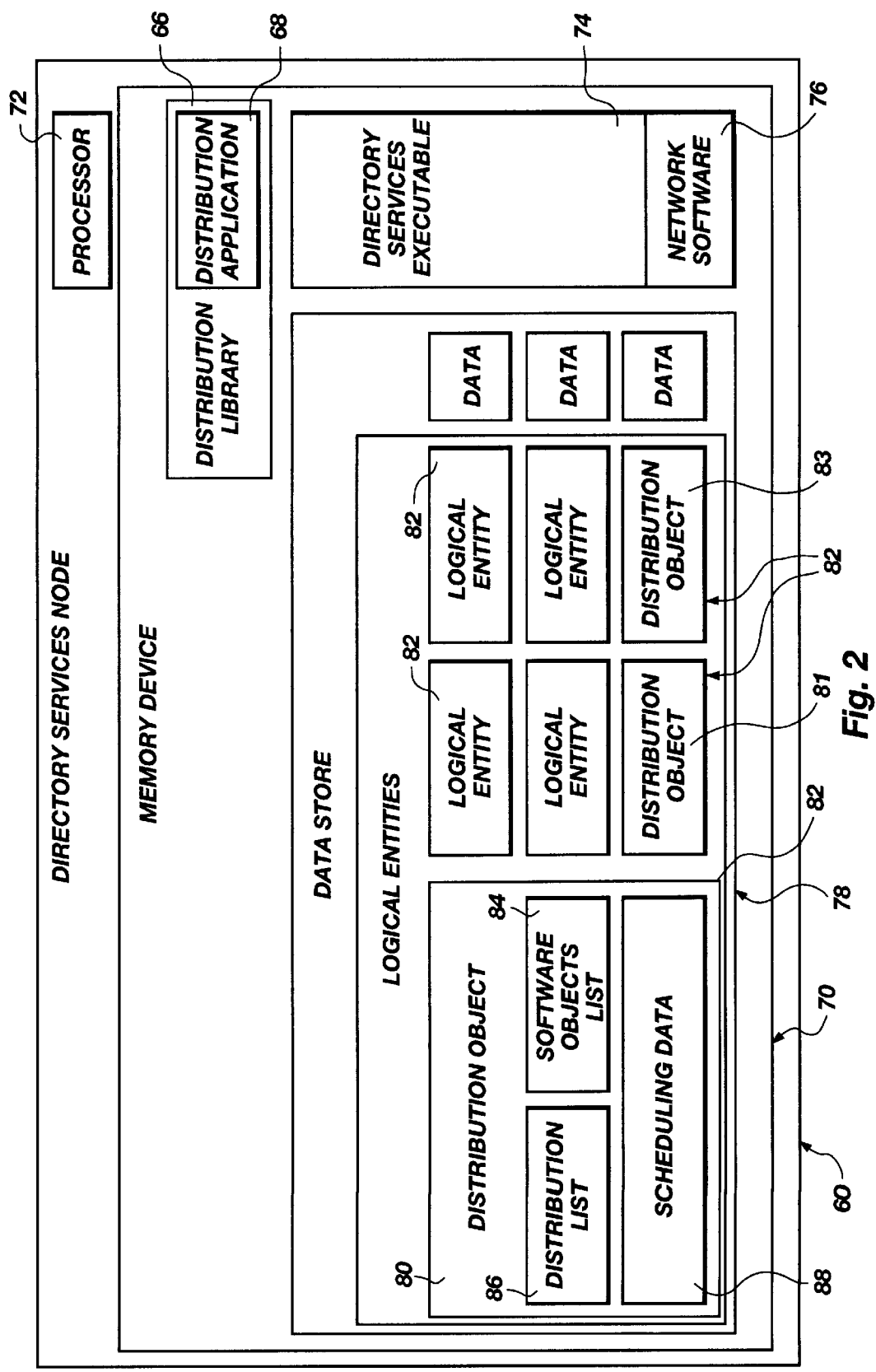
FIG. 2 is a schematic block diagram of a directory services node in the apparatus of FIG. 1.

Referring to FIG. 2, a directory services node 60 may include a memory device 70 or memory 70 operably connected to a processor 72 or CPU 72. The memory 70 may store data structures such as the data store 78 or the executables 74, 76.

The directory services executable 74 may include a single instruction or many instructions, but is typically a massive application executable on the processor 72 to provide directory services related to logical entities 82 in the data store 78. The directory services executable 74 may typically operate on top of network software 76. The network software 76 provides the networking capability to connect the directory services node 60 to the network 30. Thus, the directory services executable 74 may communicate to other nodes 52 over the network 30 by way of the network software 76 executed by the processor 72 as appropriate.

The data store 78 associated with a directory services node 60 contains interrelated logical entities 82. The logical entities 82 are typically related in a hierarchical relationship. For example, directory services trees commonly represent numerous logical entities, each corresponding to some real entity of significance to a user, interconnected by relationships or links.

Real entities may include organizational structures or groups, hardware devices in a network or an internetwork, individuals by name within an organization, organizational positions in an organizational structure, dealers in a distribution chain for commercial marketing, and the like. The logical entities 82 are related to one another, each bearing some correspondence relationship to some real entity, typically located elsewhere.

On the other hand, a logical entity 82 may correspond to a node 52, such as the directory services node 60 itself. Meanwhile, other logical entities 82 may correspond to various nodes 52 in the network 30.

The logical entities 82 may include a distribution object 80 as one of the logical entities 82. A distribution object 80 may include data structures representing information associated with one or more distributions to be effected by a node 52 in the network 30.

For example, a distribution object 80 may include a list 84 of software objects. The software objects list 84 may contain a listing of numerous software objects 100 to be distributed according to information contained in the distribution object 80.

In an alternative embodiment, distribution lists 86 may be contained within the distribution object 80. The distribution object 80 may identify or correspond to particular logical entities 82 to which (or to whose corresponding real entity) a software object 100 is to be distributed. In yet another alternative embodiment, a distribution object 80 may contain binding information to bind software objects 100 identified in a software objects list 84 to distribution lists 86 identifying logical entities 82 to which a particular, bound, software object 100 is to be distributed.

A distribution object 80 may also contain scheduling data 88. The scheduling data 88 may correspond to a distribution list 86, a software object list 84, or both. Scheduling data 88 may provide limitations on the timing to be observed in conducting a distribution of a software object 100 in accordance with a distribution object 80.

Figure 3:
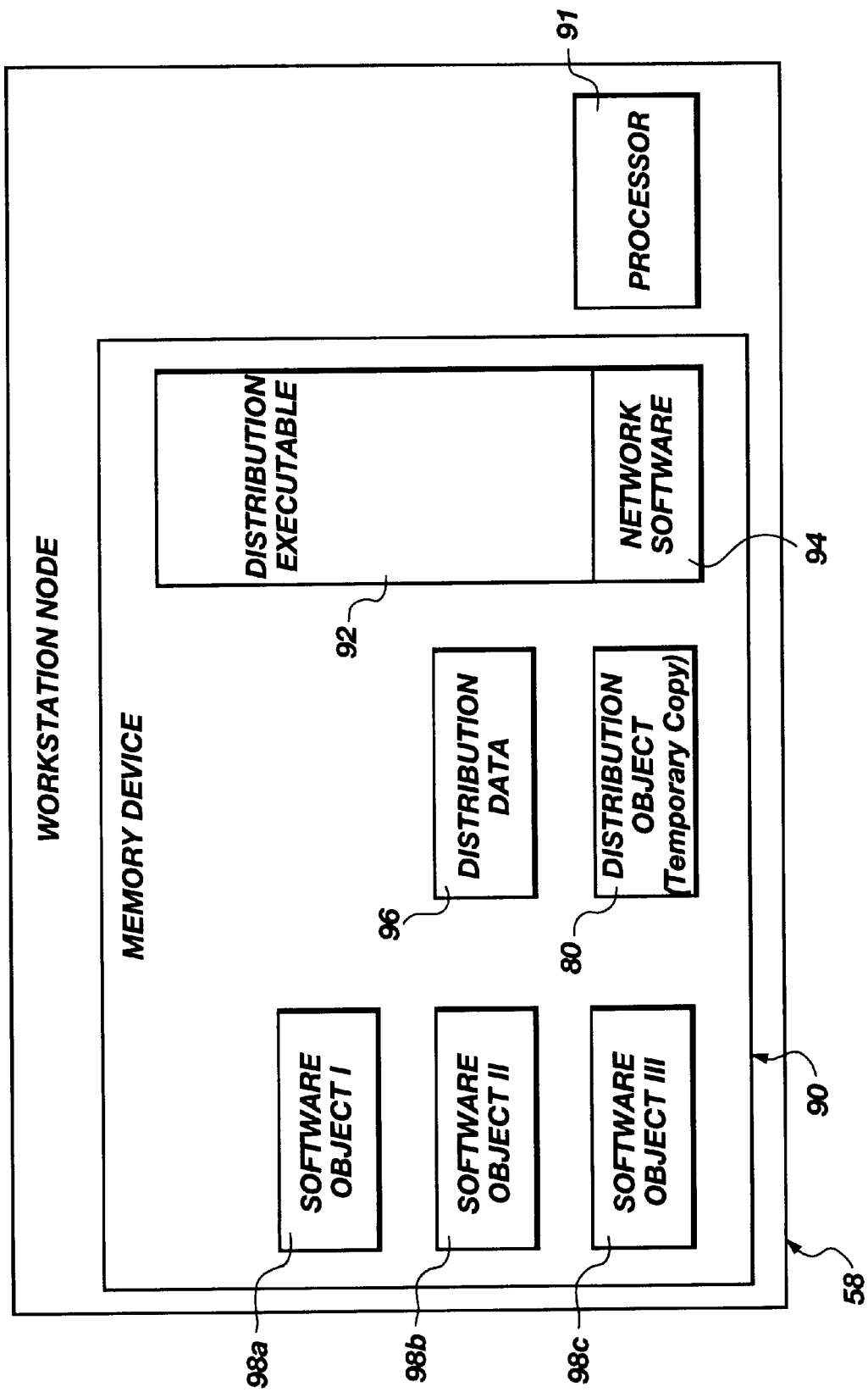
FIG. 3 is a schematic block diagram of a workstation node for effecting a software distribution in the apparatus of FIG. 1.

Referring to FIG. 3, a workstation node 58 may contain a memory device 90 or memory 90 for storing executables and data. For example, a distribution executable 92 may be stored to be executed by a processor 91. The distribution executable 92 may be programmed to distribute a software object 100 from a source node 56 to destinations corresponding to logical entities 82, in accordance with the distribution object 80.

The executables 74, 92 for interaction of the workstation node 58 and the directory services node 60 may run on top of client 94 and server software 76 that implements the network connections of all nodes 52. The type of network 30, and the client to server relationships, are not critical to the invention. That is, the directory services node 60 and the workstation node 58 may be any appropriate nodes 52 in a network 30 hosting the appropriate software 76, 94 required for communication with one another.

The workstation node 58 may store a copy 80 (see FIG. 3) of the distribution object 80 (see FIG. 2), but need not do so in all cases. In one currently preferred embodiment, a temporary copy 80 of a distribution object 80 may be stored in the memory device 90 for some time sufficient to extract or use distribution data 96 contained therein.

After completion of a distribution, a workstation node 58 may save or destroy the distribution data 96 obtained from the distribution object 80 to effect the distribution. A workstation node 58 may thereby transfer to itself various software objects 98, such as the software objects 98a, 98b, 98c. Any of the software objects 98 may be a copy or instantiation of the software object 100 or the software object 102 from the source node 56. Alternatively, the software objects 98 may originate elsewhere.

Figure 4:
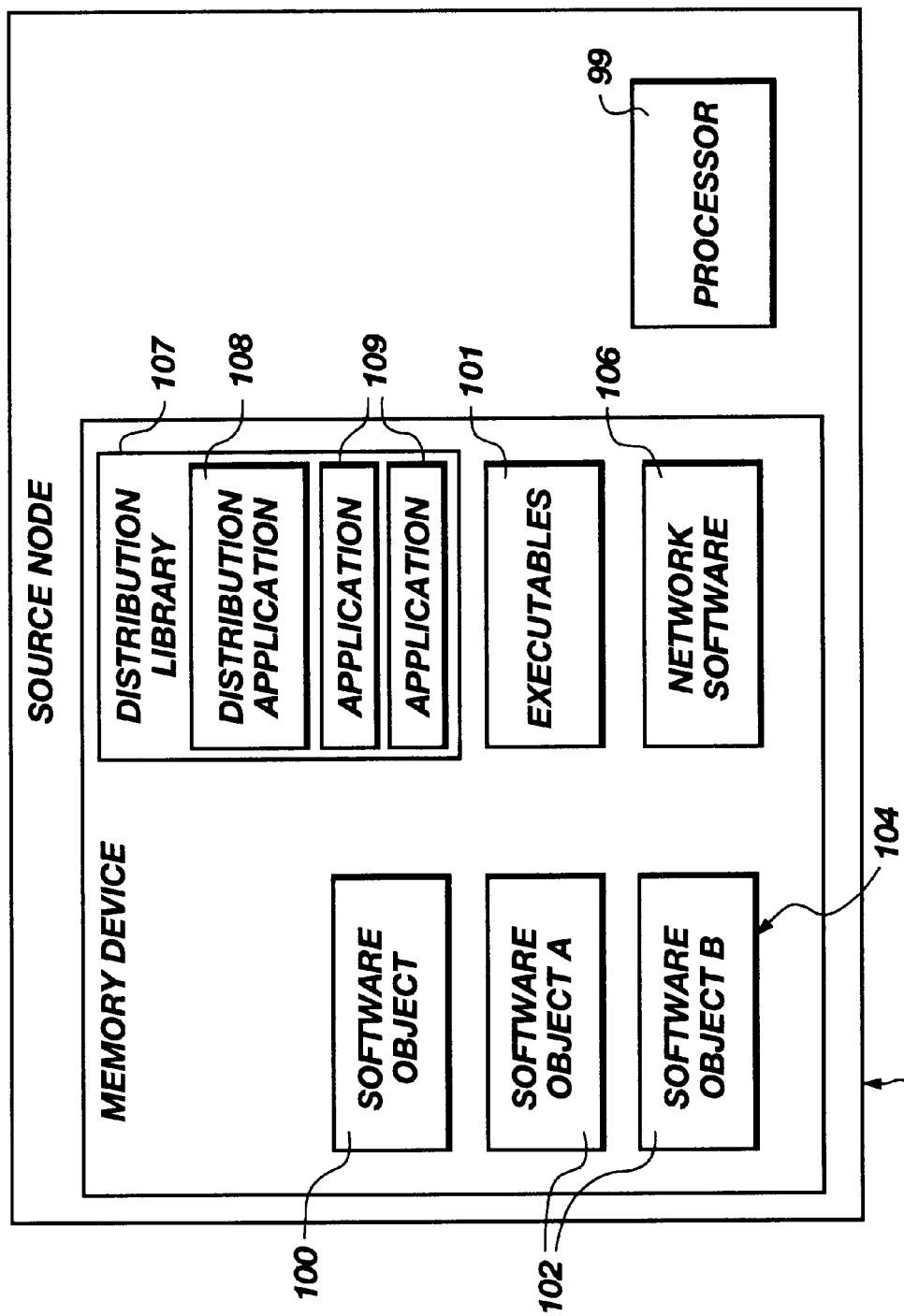
FIG. 4 is a schematic block diagram of a source node for providing a software object to be distributed in accordance with the invention in the apparatus of FIG. 1.

Referring to FIG. 4, a source node 56 may contain a processor 99 for executing executables 101 stored in the memory device 104. For example, network software 106 is one executable that will typically be executed by the processor 99 to maintain a connection between the source node 56 and the network 30.

In general, the significance of a source node 56 is that a software object 100 or multiple software objects 100, 102 are stored in the memory device 104 thereof. The software objects 100, 102 may be distributed by a workstation node 58 to other nodes 52, including the workstation node 58 in the network 30.

Figure 5:
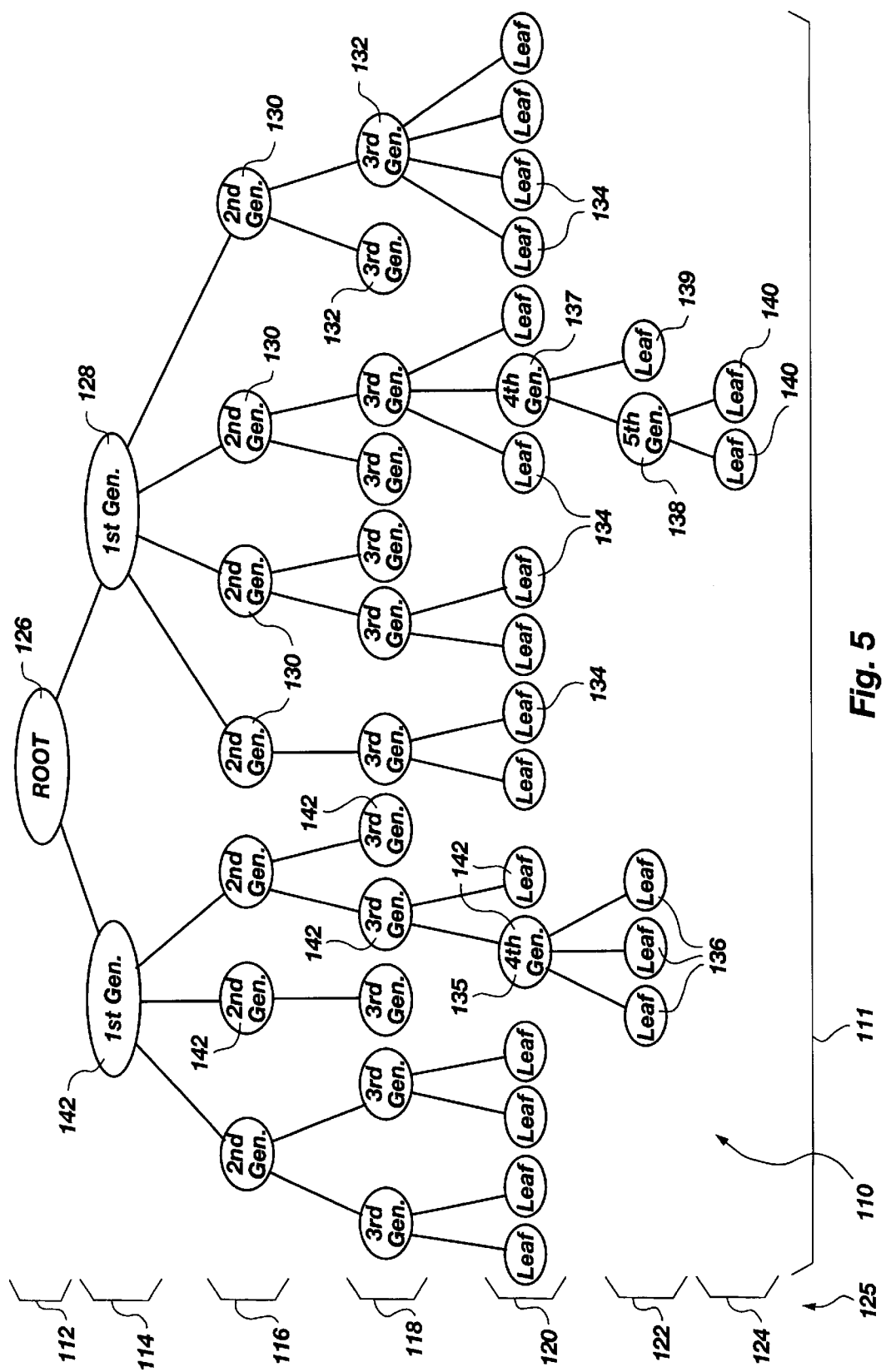
FIG. 5 is a schematic block diagram of a memory device, which may be made up of one or more of the memory devices of FIG. 1, to store the data structures for implementing the invention in the apparatus of FIG. 1.

Referring to FIG. 5, a tree representation of a hierarchy of 110 of nodes 111 or logical entities 111 is represented. The logical entities 111 may be the logical entities 82 of the data store 78 in the directory services node 60.

It is important to realize that logical entities 111 may be made up of data corresponding to a real or actual entity. For example, a logical entity 111 may be an entry, record, field, or the like in a database. Nevertheless, the logical entity 111 may correspond directly or indirectly to a computer, a database, another logical entity, an organization, a location, a person, a process, a machine, or the like. Thus, an activity (e.g. distribution) may occur with respect to an actual entity, corresponding to a logical entity 111.

In general, a hierarchy may be represented as a tree 110 having different levels 112, 114, 116, 118, 120, 122, 124. These levels 125, collectively or individually, may be characterized in terms of a root 126 with subsequent levels 114 corresponding to a first generation of children or branches from the root 126.

For example, the node 128 or logical entity 128 in the tree 110 is a first generation child of the root 126, or a first generation branch 128 of the root 126. Similarly, the nodes 130 in the level 116 correspond to second generation children with respect to the root 126.

The second generation nodes 130 are the first generation of children with respect to the node 128 and the second generation with respect to the root 126. Similarly, in the level 118, third generation children 132 or branches 132 descend from second generation children nodes 130.

At the level 120, various leaf nodes 134 exist. The leaf nodes have no further branches or children. Instead, the leaf nodes 134 terminate their respective branches of the tree 110.

By contrast, in the level 120 certain nodes 135 branch further to the leaf nodes 136 in the level 122. Meanwhile, in this example, certain nodes 137 branch to both fifth generation nodes 138 in level 122 and to a leaf node 139 in level 122. Moreover, the fifth generation node 138 in the level 122 branches further to the leaf nodes 140.

The various levels 125 may correspond to levels of hierarchy or relationship in a real environment. Thus, although the tree 110 represents logical entities 111 or nodes 111 arranged by levels 125, these logical entities 111 may actually represent real entities.

In a distribution context, rights, relationships, needs, functions, and the like corresponding to real entities, may be represented by each of the levels 125 and each of the nodes 111 in the tree 110 or hierarchy 110. Thus, one may speak of the nodes 111 as if they were their own corresponding real entities, although, in reality, it is understood that the nodes 111 are logical entities 111 corresponding to real entities or representing real entities.

Rights of distribution or need for distribution of a software object 100 may vary between the levels 125 and even among different nodes 111 within a single level 125. Accordingly, a distribution object 80 may contain information corresponding to distribution rights to be observed by a workstation node 58 in conducting a distribution of a software object 100 among the real entities corresponding to the logical entities 111 or between the level 125 in the hierarchy 110.

Figure 6:
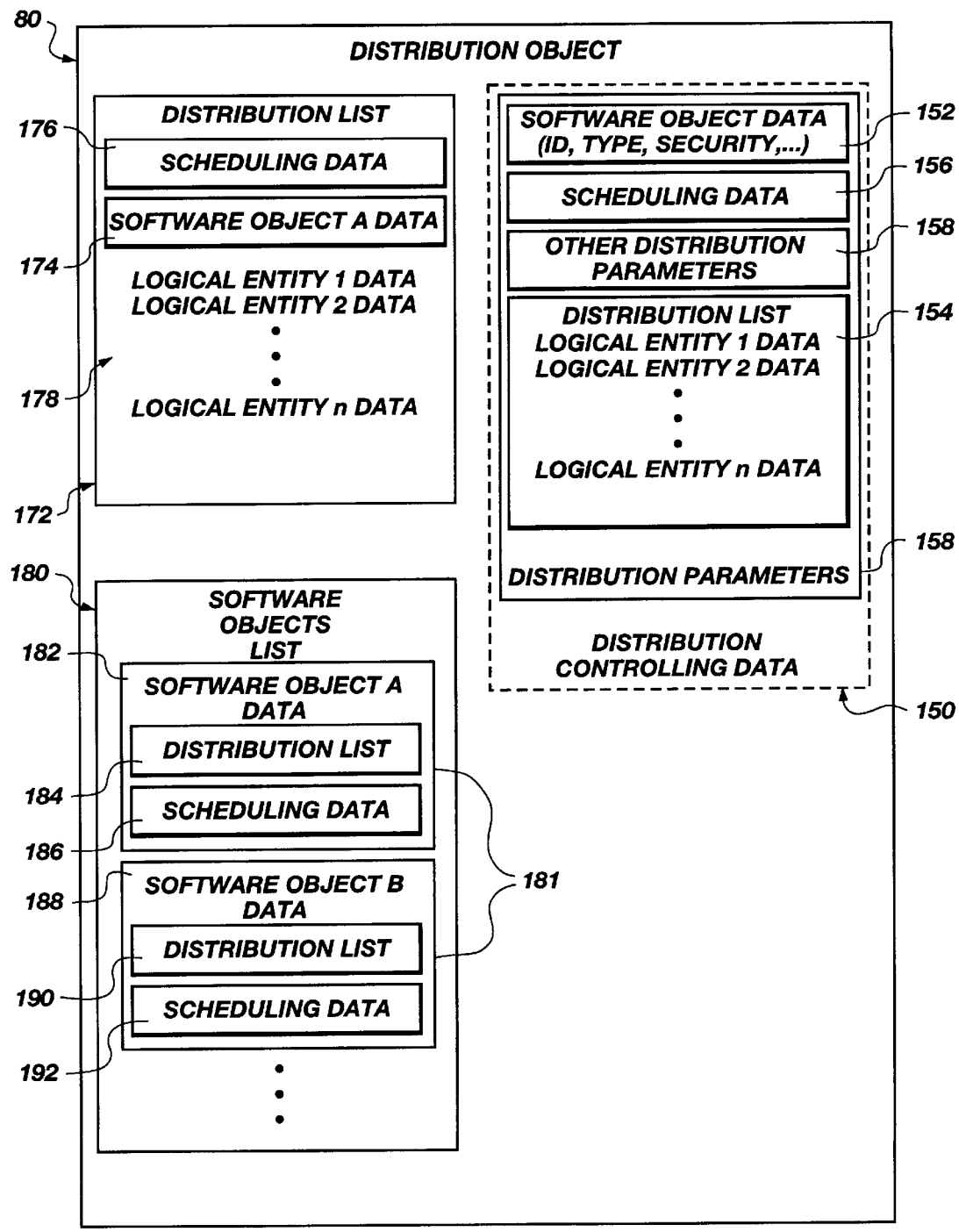
FIG. 6 is a schematic block diagram of data structures comprising a distribution object in accordance with the invention.

Referring to FIG. 6, a distribution object 80 may contain distribution-controlling data 150. The distribution-controlling data 150 may be embodied in individual objects 152, 154, 156, 158, or the distribution-controlling data 150 may be considered an object itself.

In one embodiment, distribution-controlling data object 150 may be a distribution list 172. The distribution list 172 may contain software object data 174 binding the distribution list 172 to a particular software object 100 to be distributed. Scheduling data 176 may be bound to the distribution list 172 or may be contained therein as a field, record, object, or the like.

Principal in the distribution list 172 is a list 178 or logical entity data 178. The list 178 contains data identifying and otherwise describing or characterizing various logical entities 82 to which the software object 100 corresponding to the software object data 174 is to be distributed.

One should keep in mind that strictly speaking, the software object 100 may be distributed to a real or actual entity corresponding to a logical entity 82. Nevertheless, whether or not the software object 100 is actually sent to the logical entity 82 or is sent to the real object corresponding to a logical entity 82, one may speak of either situation as a distribution to a logical entity 82 and be understood.

A logical entity 82 represents, schematically, a real entity for purposes of visualization. For example, relationships within an organization of people are intangible. Nevertheless, members of that organization exist, and may be represented on a chart, or may be represented by some data structure representing the people (entities) and their relationships.

Distribution-controlling data 150 may include software object data 152. Software object data 152 may, in turn, include identification of a particular software object 100 to be distributed; a type corresponding to either the software object 100 or the nature of a distribution being effected; security information, such as access lists, right-to-know data, or need-to-know data; and the like. Thus, the software object 100 may be characterized with the software object data 152.

Meanwhile, scheduling data 156 may contain information such as the date by which a distribution must start, may start, must not start, or the like. Similarly, scheduling data 156 may include end dates, after which no distributions may be made.

In one example, virus eradication software may be executed. Scheduling may be critical to assure that the virus is not permitted to survive in one part (original host) of a system while being eradicated in another, only to be transferred into that other part of the system when the one is being scanned to eradicate the virus.

Likewise, completely consuming network resources for a distribution may be unwise. Accordingly, in certain circumstances, a lengthy window over which a distribution may occur may be called out in the scheduling data 156.

The distribution list 154 may identify logical entities 82 that are to receive a copy of a software object 100 to be distributed. A workstation node 58, may review a distribution list 154 to determine whether or not that individual workstation node 58 is identified to receive a distribution of a software object 100.

When a workstation node 58 finds itself identified in a distribution list 154, the workstation node may load or download the appropriate distribution object 80 and proceed with the distribution in accordance therewith. Similarly, a workstation node 58 may find itself identified in other distribution parameters 158. For example, a workstation node 58 may find that it has been identified in other distribution parameters 158 as the distributing end node 52, to distribute over some distribution list 154 to other workstation nodes 62. Thus, distribution may occur in parallel. Thus, the work load is broadly distributed.

Distribution itself may occur by any mechanism known in the art. That is, distribution of a software object 100 may be as simple as copying the software object 100 to a particular node 52, such as the workstation node 58. The distribution-controlling data 150 may control a distribution by identifying information such as access rights, timing, and the like.

In an alternative embodiment of an apparatus and method in accordance with the invention, distribution-controlling data 150 may be embodied in a software objects list 180. The software objects list 180 may include data structures 181 containing software object data 182, 188. The software object data 182, 188, may include a distribution list 184, 190, corresponding to the particular software object 100 in question.

Similarly, the scheduling data 186, 192, may be found in a respective distribution list 184, 190 as well as, or instead of, in the software object 182, 188. Thus, a software objects list 180 may be associated with a simple distribution. Alternatively, a single distribution list 172 may be associated with a distribution. In either event, a respective distribution list 184 may be bound to a software object 182, or a distribution list 172 may be bound to a software object 174 (software object data 174 corresponding to the software object 100).

The distribution parameters 158 may include any available, necessary, helpful information, or the like up to and including the entire distribution-controlling data 150.

Figure 7:
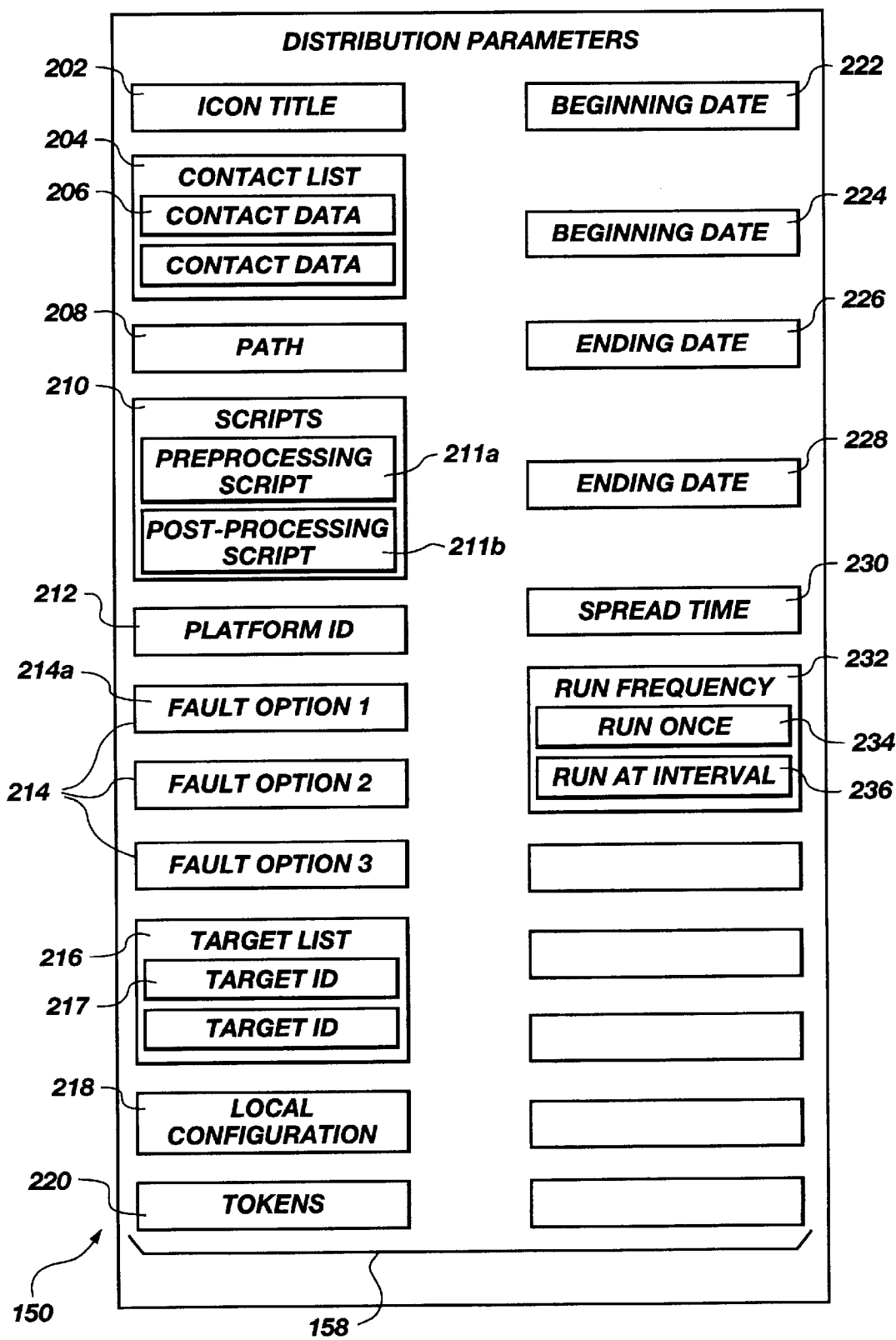
FIG. 7 is a schematic block diagram of distribution parameters that may be included in the distribution-controlling data of a distribution object of FIG. 2.

Referring to FIG. 7, several distribution parameters 158 may be included in the distribution-controlling data 150. For example, distribution parameter 158 may include a title 202, contact list 204, path 208, scripts 210, platform identifier 212, fault options 214, and target lists 216. Likewise, distribution parameters may include local configuration data 218, tokens 220, and the like.

Scheduling controls, such as the scheduling data 156 may include distribution parameters 158 such as a beginning date 222, beginning time 224, ending date 226, ending time 228, or a spread pattern 230. Likewise, run-frequency data 232 may be provided.

A distribution icon title 202 may be an included distribution parameter 158. The distribution icon title 202 may be a descriptive identifier to be associated with an icon representing a distribution, or a distribution object 80. Moreover, the distribution icon title 202 may be the name by which a distribution is known.

The distribution object 80 may contain a list 204 of contacts or contact list 204. Each contact record 206, or entry 206 may represent an individual person responsible for implementing a distribution associated with the distribution object 80.

Individuals identified in the contact list 204 may be appropriate to contact in the event of a failure or question with respect to a distribution. Thus, the contact list 204 may identify some human contact data 206 for the user associated with the workstation 58, source node 56, or directory services node 60.

A path 208 may be provided for identifying an application 108 to be executed as part of a distribution process. The application path 208 serves as a pointer to an executable 108 that may be used by the distribution executable 92 hosted by the workstation 58. The application 108 may be thought of as a called routine 108 in a library 107 of routines 108, 109. A routine 108 or application 108 provides services associated with the distribution process. The application 108 may be embedded in the distribution executable 92. However, it may be advantageous to separate certain generic processes 108, 109 to be executed by any distribution executable 92 in any workstation 58.

Scripts 210 may be provided. A first script 211a may be executed prior to a distribution. The second script 211b may be a post-processing script 211b for use by the workstation. The pre-processing script 211a may be used as a set up routine 211a, for example, by the workstation 58 prior to a distribution. The post-processing or second script may be executed by the workstation 58 as a clean-up to restore configurations as necessary.

A platform identifier 212 may be included in the distribution object 80. A platform identifier 212 may target or identify those platform types for which a distribution is intended. For example, certain software may only be appropriate for certain platform configurations, models, and the like. Thus, the platform types for which a distribution is intended may be identified in the distribution object 80.

In one embodiment, a distribution object 80 may actually be instantiated multiple times. For example, in order to balance the use of resources involved in a distribution, certain instantiations of a distribution object 80 may be associated with different servers 54, source nodes 56, and the like. Thus, when a workstation node 58 accesses a distribution object 80, a selection algorithm may provide one of several instantiations 80, 81, 83 of the distribution object 80. In this way, the resources available for a distribution may be partitioned among several instantiations 80, 81, 83 of the distribution object 80 to balance the distribution task load.

Different instantiations 80, 81, 83 of the distribution object 80 are not required to be identical to one another. That approach is available in one alternative embodiment. However, in order to balance the distribution task load, instantiations 80, 81, 83 of a distribution object 80 may be similar or identical, in almost every respect, except for one or more distribution parameters 158. For example, the choice of server 54 or the choice of source node 56, or the choice of some path 208 may vary between instantiations 80, 81, 83.

In an apparatus and method in accordance with the invention, the multiple instantiations may be identical. Alternatively, they may differ in any respect in order to serve the need of balancing the distribution task load.

Fault tolerance options 214 may be built into a hierarchy of distribution objects. Fault options 214 such as primary 214a, secondary 214b, and tertiary 214c options may identify alternative distribution objects 80, 81, 83 to be used in the event of a failure.

For example, a primary set of options 214a for a distribution may select one distribution object 80. In the event of a failure of the distribution in accordance with the first (primary) choice 214a of distribution object 80, an alternative or second choice 214b corresponding to or identifying another distribution object 81 may be accessed.

Similarly, a failure, for any reason, of a distribution, in accordance with the distribution object 81, or distribution-controlling data 150 contained in the distribution object 81 second choice 214b may result in a default to a third choice 214c. The third choice 214c may correspond to a distribution object 83, and so on.

Thus, the distribution will proceed, even though not as rapidly, not in a desired path, not in a desired time, or not according to a desired schedule, or not according to some other failed, although preferred, method or hardware. Thus, any parameter that may be subject to a failure, may be bypassed for an alternative parameter value in another distribution object 81, 83 of lesser preference in a fault tolerance hierarchy 214.

An association list 216, or target list 216, may contain identifiers associated with all of the logical entities 82 in a directory services data store 78 corresponding to actual entities that are targeted to receive a distribution associated with a distribution object 80. Different target identifiers 217 may be provided in the target list 216.

A target identifier 217 may be a name, a characteristic, a quality or condition, or any other characterization by which appropriate targets may be distinguished from non-targets. Thus, a distribution may be controlled on the basis of need-to-know, access rights, or any other identifiable parameter that may be included as a target identifier 217 or target characteristic 217.

Local configuration data 218 may be included in a distribution object 80. Local configuration data 218 may identify to a workstation node 58 conducting a distribution, certain local configurations of the workstation node 58 that should be implemented as part of the distribution. The configuration data 218 may be embodied as configuration objects 218 within the distribution object 80. Thus, at different times associated with a distribution, different configurations may be implemented according to the configuration objects 218.

Tokens 220 may be provided in a distribution object for tokenizing virtually any distribution parameter. In one embodiment, tokens 220 may be implemented as macros. Any string, variable, or other parameter may be identified as a macro (token, etc.) which will point to other data, strings, parameters, executables, or the like to define the parameter that is represented by the token 220.

Accordingly, when a particular distribution-controlling parameter is to be accessed, a token may instead be accessed to redirect the flow of the distribution. Thus, in place of a constant distribution parameter, the token 220 may point to another string of data, another executable, another parameter, or another macro to be executed to provide the actual value of the parameter in question during that distribution.

Scheduling data 88 (see FIG. 2) may include several parameters of significance to a distribution. For example, certain distributions may be executed in parallel as a matter of revision control, security universality, or the like.

Further to the example, distributions may be implemented well in advance by creating a distribution object 80. The scheduling data 88 in the distribution object 80 may cause a distribution to occur at or near a particular date and time when a new revision of a software object is to become available. Thus, every distribution target 142 (see FIG. 5) may receive the software object 100 of a distribution at the same time. Such simultaneity may preclude operation with obsolete software by particular nodes 11, 52, 58, 64 within a network 30.

In another scenario, a virus eradication software object may be implemented. In order to assure universality of eradication, all distributions may be scheduled to occur simultaneously. This simultaneity may preclude the virus surviving, since the virus cannot take advantage of time lags between implementation of the virus eradication object in various targets 142. The virus cannot "hide" in one part of a network 30 while eradication occurs in another part of the network 30, to migrate again later.

Scheduling data may include an effective beginning date 222 and beginning time 224 at which a distribution may begin. This may be thought of as an authorization time or date. Other parameters may provide an imperative requirement that a distribution must begin by a certain date and time.

An ending date 226 and ending time 228 may provide an end to an authorization. That is, no distribution may occur after the end date 226 and end time 228.

A spread time 230 may be provided. A spread time 230 may be used to establish a window over which time a distribution will occur. For example, it is undesirable to completely dominate a network or several nodes 52 in a network 30 at one time.

On the other hand, a certain simultaneity may be desirable. Thus, the spread time 230 may provide a size for a time window during which the distribution should occur. The time window established by the spread time 230 may begin at some time (e.g. anytime) between the begin date 222 and time 224 and the end date 226 and time 228.

The spread time 230 is an optional parameter. It need not be required. However, it may allow a distribution to meet certain criteria for simultaneity without disrupting other work.

A run frequency 232 may be established by a "run once" selection 234, a "run-at-interval" selection 236 or the like. The run frequency 232 may control a distribution to a single execution. Alternatively, the distribution may be periodically repeated.

For example, a database may require updating periodically. Thus, an updating distribution of a software object 80 may occur daily, hourly, or the like. Similarly, a software distribution may occur on a single occasion. In setting up a distribution object 80, the frequency 232 of distribution or frequency 232 of execution may be endowed with any suitable periodicity.

Figure 8:
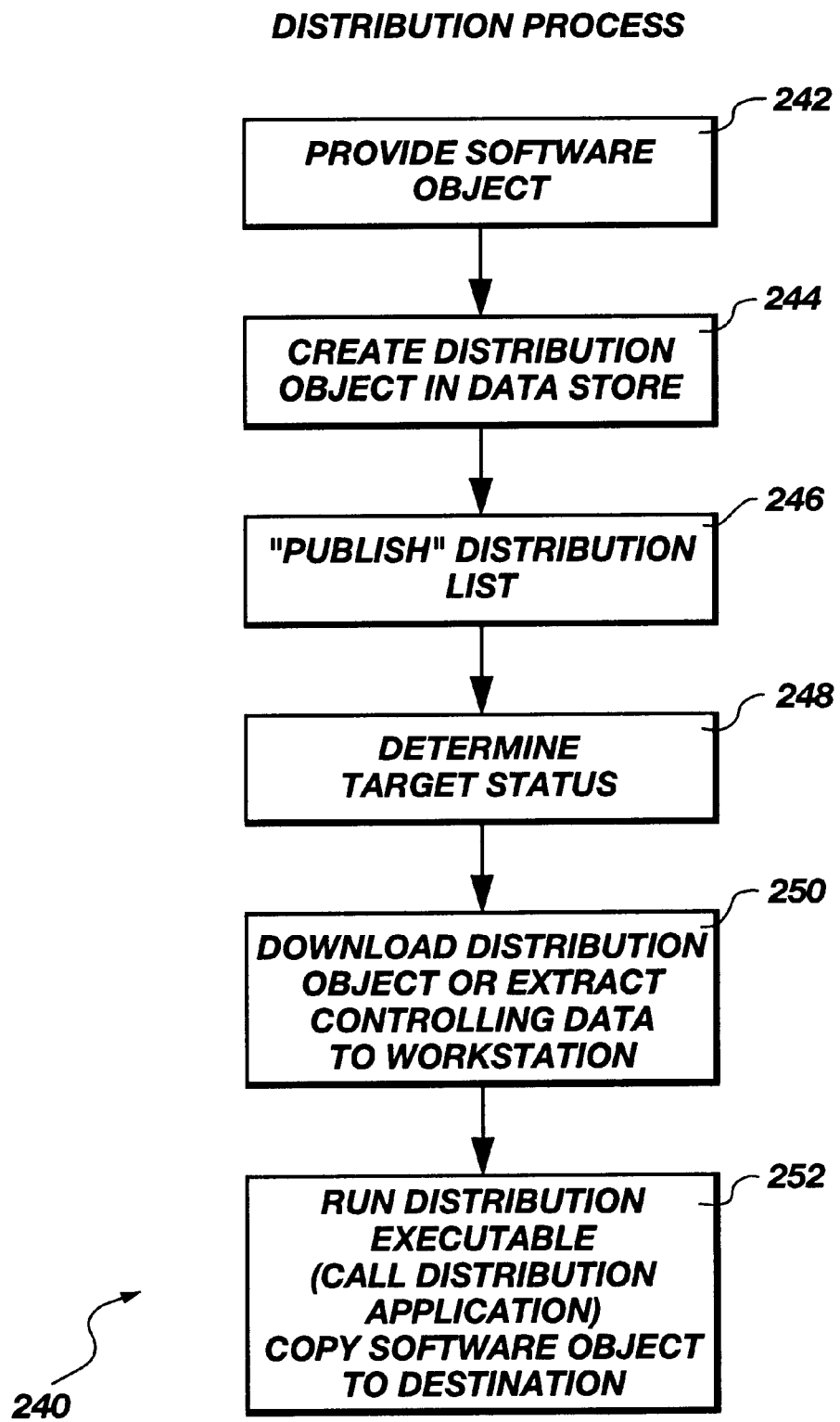
FIG. 8 is a schematic block diagram illustrating steps of a method consistent with the invention for distributing a software object in accordance with a distribution object contained within a data store of a directory services node of FIG. 2.

Referring to FIG. 8, a distribution process 240 may include a provision 242 of a software object 100. The step 242 of providing a software object may include providing the apparatus 10, or any desired or necessary part thereof for hosting a software object 100, and a distribution object 80.

A create step 244 may include providing a distribution object 80 containing all necessary distribution parameters 158 and any other distribution-controlling data 150. The create step 244 includes locating the distribution object 80 in a data store 78.

The create step 244 may include the publish step 246. In one currently preferred embodiment, a distribution object 80 may simply be available such that a target list 216 may be read by workstations 58 and other nodes 52 that are targeted for distribution of a particular software object 100. In an alternative embodiment, the publish step 246 may be a separately identifiable publication of a distribution list such as the target list 216.

In yet another alternative embodiment, an actual distribution list may be provided for binding some number of target identifiers 217 to an identification of certain software objects 100 to be distributed according to some distribution object 80 also bound thereto. The implementation scheme for the steps 244, 246 is not so critical as the objectives to be accomplished.

The distribution object 80 associated with a software object 100 to be distributed, needs to be provided. Thereafter, some mechanism to publish the information associating the software object 100 and distribution object 80 corresponding thereto with a target identifier 217 is needed.

Similarly, the determination step 248 for determining whether or not a particular node 52 is represented in a target list 216 for a distribution, may be done automatically as a part of a publication 246. Alternatively, a particular node 52, such as a workstation 58 may actually make a separate determination 248 that it, or some other node 52, 62, for which it 58 is responsible, has been targeted for a distribution.

The download 250 by the responsible workstation 58 may copy all or part of a distribution object 80 to the workstation node 58 needing the distribution-controlling data from the distribution object 80 in order to complete the distribution.

Properly informed by the download 250, a workstation 58 may then run 252 a distribution executable 92. A distribution executable 92 may include, embedded within it, or may call, a distribution application 108. As discussed, a distribution application 108 may be one of several applications 108, 109 stored in a distribution library 107. Although illustrated in FIG. 4, as stored in the source node, the distribution library 107 or the distribution application 108 may be stored in any suitable memory device 14.

The distribution executable 92 may include appropriate calls or coding to effect copying of the software object 100 designated by the distribution object 80 to some destination node 52. In one embodiment, a destination node 52 may actually be the workstation node 58 itself, distributing a software object 100 to itself. In an alternative embodiment, the destination node 52 may be another workstation 62 remote from the workstation node 58 conducting the actual distribution 252.

From the above discussion, it will be appreciated that the present invention provides distribution of a software object 100 in accordance with the information available in a directory services node 60. The distribution process is itself distributed in nature.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for distributing software, the apparatus comprising:
   a network interconnecting a plurality of nodes including a source node storing software;
   a directory services node storing a network directory services system comprising directory services objects having attributes and managed by a directory services executable, each directory services object corresponding to an entity and operably related in a hierarchical tree to others of the directory services objects, the hierarchical tree reflecting the relationships between the entities;
   the directory services node being operably connected to the network and programmed to maintain a distribution object of the directory services objects, the distribution object corresponding to the software and containing attributes comprising distribution-controlling data for controlling distribution of the software, the software being independent from the directory services executable;
   a workstation node operably connected to the directory services node to retrieve the distribution-controlling data from the distribution object of the directory services node and programmed to distribute the software in accordance with the distribution-controlling data.

2. The apparatus of claim 1, wherein the software is embodied in a software object, and the workstation node is programmed to distribute the software object to the workstation node.

3. The apparatus of claim 2, wherein the distribution-controlling data further comprises a set of distribution parameters, for controlling the distribution, and an identification corresponding to the software object.

4. The apparatus of claim 3, wherein the distribution object is recognizable by the workstation node, and contains the distribution parameters.

5. The apparatus of claim 4, wherein the distribution object further comprises a distribution list identifying targets, selectable from the logical entities, the targets corresponding to actual entities to receive the distribution of the software object.

6. The apparatus of claim 5 wherein:
   the logical entities are interrelated in a hierarchy comprising a plurality of levels, each logical entity pertaining to a corresponding level; and
   the distribution list contains targets selected from more than one of the levels.

7. The apparatus of claim 4, wherein the distribution parameters include scheduling data for controlling scheduling of the distribution of the software object.

8. The apparatus of claim 7, wherein the scheduling data is effective to schedule a parallel distribution of the software object to a plurality of workstation nodes.

9. An article of manufacture comprising at least one memory device containing data structures comprising:
   a directory services system comprising directory services objects having attributes and managed by a directory services executable, each directory services object corresponding to an entity and operably related in a hierarchical tree to others of the directory services objects, the hierarchical tree reflecting the relationships between the entities;
   software to be distributed, the software having a directory services object corresponding thereto and being independent from the directory services executable;
   a distribution executable programmed to distribute the software;
   a distribution object of the directory services objects, the distribution object corresponding to the software and containing attributes comprising distribution-controlling data to be used by the distribution executable for controlling distribution of the software.

10. The article of claim 9, wherein the data store is stored in a directory services memory of a directory services node in the network.

11. The article of claim 9, wherein the software is stored in a software object in a source node memory of a source node in the network.

12. The article of claim 9, wherein the distribution executable is stored in a workstation memory in a workstation node, in the network, to be executed by the workstation node.

13. The article of claim 12, wherein the actual entity is the workstation node.

14. The article of claim 9, wherein the distribution object further comprises an identifier corresponding to a software object.

15. The article of claim 9, wherein the distribution object further comprises a distribution list identifying targets selected from the logical entities and corresponding to actual entities to receive the distribution of a software object.

16. The article of claim 15, wherein:
   the logical entities are interrelated in a hierarchy comprising a plurality of levels, each logical entity pertaining to a corresponding level; and
   the distribution list contains targets selected from more than one of the levels.

17. The article of claim 9, wherein the distribution object further comprises scheduling data for controlling scheduling of the distribution of a software object.

18. The article of claim 17, wherein the scheduling data is effective to schedule a parallel distribution of the software object to a plurality of workstation nodes in the network.

19. A method for distributing software, the method comprising:
   providing a network comprising nodes, including a directory services node, a source node, and a workstation node;
   providing a network directory services system associated with the directory services node and comprising directory services objects having attributes managed by a directory services executable, each directory services object corresponding to an entity and operably related in a hierarchical tree to others of the directory services objects, the hierarchical tree reflecting the relationships between the entities;
   providing in the source node in the network software, independent from the network directory services system, to be distributed;
   providing a distribution object as one of the directory services objects, having attributes comprising distribution-controlling data; and
   providing a distribution executable for accessing the distribution object and controlling distribution of the software in accordance with the distribution-controlling data.

20. The method of claim 19 further comprising:
   providing for execution by the workstation node, the distribution executable programmed to distribute the software from the source node to the workstation node in accordance with the distribution-controlling data in the distribution object.

21. The method of claim 20, further comprising:

providing the software embodied as a software object; and executing, by the workstation node, the distribution executable to distribute the software object.

22. The method of claim 21, wherein the distribution object contains an identifier corresponding to, and designating for the distribution, the software object.

23. The method of claim 21, wherein the distribution object further comprises a distribution list identifying targets, selected from the logical entities and corresponding to actual entities to receive the distribution of the software object.

24. The method of claim 23, wherein:

the logical entities are interrelated in a hierarchy comprising a plurality of levels each containing logical entities; and the distribution list contains targets selected from more than one of the levels.

25. The method of claim 21, wherein the distribution object further contains scheduling data for controlling scheduling of the distribution.

26. The method of claim 25, wherein the scheduling data is effective to schedule a parallel distribution of the software object to a plurality of nodes.

27. The method of claim 25, wherein the scheduling data is effective to schedule a plurality of workstation nodes to conduct a parallel distribution of the software object to the plurality of workstation nodes.

* * * * *